(12) United States Patent
Ho et al.

(10) Patent No.: US 11,110,519 B2
(45) Date of Patent: Sep. 7, 2021

(54) METAL THREE-DIMENSIONAL PRINTER

(71) Applicant: PRINT-RITE • UNICORN IMAGE PRODUCTS CO., LTD. OF ZHUHAI, Zhuhai (CN)

(72) Inventors: Leungmui Ho, Zhuhai (CN); Kinkeung So, Zhuhai (CN); Yonggang He, Zhuhai (CN)

(73) Assignee: PRINT-RITE • UNICORN IMAGE PRODUCTS CO., LTD. OF ZHUHAI, Guangdong (CN)

( * ) Notice: Subject to any disclaimer, the term of this patent is extended or adjusted under 35 U.S.C. 154(b) by 266 days.

(21) Appl. No.: 16/103,009

(22) Filed: Aug. 14, 2018

(65) Prior Publication Data

US 2019/0001410 A1 Jan. 3, 2019
US 2020/0246868 A9 Aug. 6, 2020

Related U.S. Application Data

(63) Continuation of application No. PCT/CN2017/080602, filed on Apr. 14, 2017.

(30) Foreign Application Priority Data

Feb. 19, 2016 (CN) .......................... 201610093384.5
Feb. 19, 2016 (CN) .......................... 201620131545.0
(Continued)

(51) Int. Cl.
*B29C 67/00* (2017.01)
*B22F 12/00* (2021.01)
(Continued)

(52) U.S. Cl.
CPC ............ *B22F 12/00* (2021.01); *B22F 1/0059* (2013.01); *B22F 1/0062* (2013.01); *B22F 3/227* (2013.01);
(Continued)

(58) Field of Classification Search
CPC ....... B33Y 10/00; B33Y 70/00; B29C 64/165; B29C 64/188; B22F 10/00; B22F 10/10;
(Continued)

(56) References Cited

U.S. PATENT DOCUMENTS 9,943,981 B2 * 4/2018 Gunther ................ B29C 64/165
2010/0323301 A1 * 12/2010 Tang ..................... B29C 64/165
425/174.4
(Continued)

FOREIGN PATENT DOCUMENTS

CN 103769586 5/2014
CN 103769587 5/2014
(Continued)

*Primary Examiner* — Joseph S Del Sole
*Assistant Examiner* — Thu Khanh T Nguyen
(74) *Attorney, Agent, or Firm* — Cozen O'Connor

(57) ABSTRACT

A metal three-dimensional printer, a printing method, and a three-dimensional printing material. The three-dimensional printer includes a printing head, a heating apparatus, a printing platform, and a sintering shaping chamber. The printing method includes a preliminary shaping step and a sintering step. The heating apparatus heats the three-dimensional printing material. A heating temperature of the heating apparatus is 50° C. to 300° C., and a binder bonds metal powder at 50° C. to 300° C., and the three-dimensional printing material is extruded onto the printing platform to form a preliminary cured object. In the sintering step, the preliminary cured object is sintered and cured into a shaped object.

7 Claims, 5 Drawing Sheets

(30) Foreign Application Priority Data

Apr. 27, 2016 (CN) .......................... 201610270383.3
Dec. 7, 2016 (CN) .......................... 201621339666.0

(51) Int. Cl.
- *B22F 1/00* (2006.01)
- *B22F 3/22* (2006.01)
- *B33Y 10/00* (2015.01)
- *B33Y 30/00* (2015.01)
- *B33Y 40/00* (2020.01)
- *B33Y 70/00* (2020.01)
- *B22F 10/10* (2021.01)

(52) U.S. Cl.
CPC ........... *B22F 10/10* (2021.01); *B22F 2201/10* (2013.01); *B22F 2201/20* (2013.01); *B22F 2999/00* (2013.01); *B33Y 10/00* (2014.12); *B33Y 30/00* (2014.12); *B33Y 40/00* (2014.12); *B33Y 70/00* (2014.12)

(58) Field of Classification Search
CPC .......... B22F 10/20; B22F 12/00; B22F 12/50; B22F 12/53
See application file for complete search history.

(56) References Cited

U.S. PATENT DOCUMENTS

| | | | |
|---|---|---|---|
| 2013/0000860 | A1 | 1/2013 | Hosek et al. |
| 2016/0200024 | A1* | 7/2016 | Kim ..................... B29C 64/106 425/143 |

FOREIGN PATENT DOCUMENTS

| | | |
|---|---|---|
| CN | 103801695 | 5/2014 |
| CN | 104149337 | 11/2014 |
| CN | 104163634 | 11/2014 |
| CN | 104399986 | 3/2015 |
| CN | 204844867 | 12/2015 |
| CN | 105216332 | 1/2016 |
| CN | 105583402 | 5/2016 |
| CN | 105921751 | 9/2016 |
| TW | 201532791 | 9/2015 |
| WO | WO 2016/004985 | 1/2016 |

\* cited by examiner

|  | Mass fraction of metal powder | Mass fraction of a binder |
|---|---|---|
| Embodiment 1 of a printing material | 60% | 40% |
| Embodiment 2 of a printing material | 62% | 38% |
| Embodiment 3 of a printing material | 64% | 36% |
| Embodiment 4 of a printing material | 68% | 32% |
| Embodiment 5 of a printing material | 70% | 30% |

FIG. 1

|  | Mass fraction of metal powder | Mass fraction of a binder |
|---|---|---|
| Embodiment 6 of a printing material | 75% | 25% |
| Embodiment 7 of a printing material | 80% | 20% |
| Embodiment 8 of a printing material | 85% | 15% |
| Embodiment 9 of a printing material | 90% | 10% |
| Embodiment 10 of a printing material | 95% | 5% |

FIG. 2

METAL THREE-DIMENSIONAL PRINTER

CROSS REFERENCE TO RELATED APPLICATIONS

This application is a Continuation of international application PCT/CN2017/080602, filed Apr. 14, 2017, which claims priority from Chinese patent applications 201610093384.5 filed on Feb. 19, 2016; 201620131545.0 filed on Feb. 19, 2016; 201610270383.3 filed on Apr. 27, 2016 and 201621339666.0 filed on Dec. 7, 2016. The entire contents of the above patent applications are incorporated herein by reference.

BACKGROUND OF THE INVENTION

Field of the Invention

The invention relates to the field of three-dimensional printing, and particularly, to a metal three-dimensional printer configured to print a metal object and a printing method, and the present invention further provides a three-dimensional printing material for printing a metal.

Description of the Related Art

Three-dimensional rapid shaping, that is, 3D printing, also known as additive manufacturing, is based on the basic principle of producing three-dimensional objects by printing or laying down successive material layers. A three-dimensional rapid shaping device or a three-dimensional printer works by converting a three-dimensional computer model of an object and producing a series of cross-sectional slices. Then, each slice is printed, one on top of the other, to produce the final three-dimensional object.

Three-dimensional rapid shaping methods mainly include the following types: stereolithography (SLA) or light curing, laminated object manufacturing (LOM), selective laser melting (SLM), and fused deposition modeling (FDM).

At present, FDM-type 3D printers on the market are the most common. This type of 3D printer has a relatively low production cost and the printing operation is relatively convenient and easy for beginners to grasp. The main principle is to melt a linear wire material such as PLA (polylactic acid) by using a high-temperature nozzle, and extrude the molten material through a nozzle outlet by means of continuous extrusion of the subsequent wire material, and then stack the molten material layer by layer on a printing platform to generate a three-dimensional object. For example, in the Chinese invention patent application documents with application numbers CN201410827191.9, CN201510054483.8 and CN201510313735.4, an FDM-type three-dimensional printer and a working principle thereof are disclosed. The 3D printer uses a method in which the wire material is melted and accumulated layer by layer, resulting in a relatively long print shaping time. In addition, because the layers of the shaping material are cooled and connected after being bonded by only the molten material, when material temperatures of the layers are different, the adhesion relationship between the layers is unstable, resulting in unstable structural strength of the shaped object. After a three-dimensional shape object is placed for a period of time, the layers may even separate from each other.

In addition, for the SLM-type 3D printing in which powder is sintered and shaped by using laser, the basic principle is to lay down a layer of powder material on a printing platform and then selectively sinter it by using laser, and then lay down the next layer of power material and sinter it by using laser once again. After the above steps are cycled, a three-dimensional material object can be obtained. However, the laser sintering method needs to consume a large amount of energy to make the powder shaped after being melted at a high temperature, and this type of 3D printing device needs professional maintenance and consumes extremely high costs. For example, in a Chinese utility model patent application with the application number 201420377082.7, a three-dimensional printer that sinters metal powder by using laser is disclosed. The printer completes powder laying work on a printing platform by using a powder laying roller, and then performs selective laser sintering. This printer is not only inefficient in powder laying, but also needs to consume a large amount of energy in the laser sintering process, and this also reduces the working efficiency.

SUMMARY OF THE INVENTION

A first objective of the present invention is to provide a three-dimensional printer that rapidly shapes a metal three-dimensional object.

A second objective of the present invention is to provide a printing method of a three-dimensional printer that rapidly shapes a metal three-dimensional object.

A third objective of the present invention is to provide a three-dimensional printing material for metal three-dimensional printing.

Technical Solutions

In a printing method of a three-dimensional printer provided in the present invention, the three-dimensional printer includes a printing head. The printing head contains a three-dimensional printing material, and the three-dimensional printing material consists of metal power with a mass fraction of 60% to 70% and a binder with a mass fraction of 30% to 40%. The printing method includes the following steps: a preliminary shaping step: spraying the three-dimensional printing material onto a printing platform to form a preliminary cured object; and a sintering step: sintering and curing the preliminary cured object into a shaped object.

Preferably, the printing head has a heating apparatus configured to heat the three-dimensional printing material. The printing method further includes a heating step. In the heating step, the heating apparatus heats the three-dimensional printing material contained in the printing head, and then sprays the three-dimensional printing material onto the printing platform.

Preferably, the binder is a water soluble binder. The printing method further includes a water immersion step: the preliminary cured object is placed in water, and at least one part of the water soluble binder in the preliminary cured object is dissolved into the water. Preferably, the water immersion step is immersion by using warm water, and a temperature range of the warm water is between 60° C. and 80° C.

Preferably, the printing method is performed under a vacuum condition or under inert gas protection.

Preferably, the metal powder is at least one of bronze, a cobalt base alloy, a copper base alloy, a gold base alloy, a nickel base alloy, stainless steel, iron, lead, and a zinc alloy. In addition, the water soluble binder is at least one of a polyethylene glycol binder, a polymethylmethacrylate binder, and a polyethylene oxide binder.

Preferably, a heating temperature of the heating apparatus is controlled between 50° C. and 200° C., and a temperature in the sintering step is controlled between 200° C. and 2000° C.

In another printing method provided in the present invention, a three-dimensional printer includes a printing head; the printing head contains a three-dimensional printing material; the three-dimensional printing material includes metal powder and a binder; in addition, a weight percentage of the metal powder in the three-dimensional printing material is more than 60%; the printing method includes the following steps: a preliminary shaping step: heating the three-dimensional printing material by using a heating apparatus, where a heating temperature of the heating apparatus is between 50° C. and 300° C., and the binder bonds the metal powder at 50° C. and 300° C., and extruding the three-dimensional printing material onto a printing platform to form a preliminary cured object; and a sintering step: sintering and curing the preliminary cured object into a shaped object.

Preferably, a weight percentage of the metal powder in the three-dimensional printing material is more than 70%, and the metal powder is at least one of bronze, a cobalt base alloy, a copper base alloy, a gold base alloy, a nickel base alloy, stainless steel, iron, lead, and a zinc alloy; and the binder is at least one of resin wax, light curable wax, and a light curable UV material.

A metal three-dimensional printer provided in the present invention includes a printing head, configured to contain a three-dimensional printing material, where the three-dimensional printing material consists of metal power with a mass fraction of 60% to 70% and a binder with a mass fraction of 30% to 40%, and the metal three-dimensional printer further includes a heating apparatus, configured to heat the three-dimensional printing material in the printing head; the metal three-dimensional printer further includes a printing platform, configured to bear the three-dimensional printing material sprayed by the printing head, to form a preliminary cured object.

Preferably, the printer further includes a water tank, the water tank contains water, and the water in the water tank is used to immerse the preliminary cured object. Further, the printer further includes a sintering shaping chamber, configured to perform sintering shaping on the preliminary cured object.

Preferably, the printing head has a chamber, a screw, and a feed inlet, where the feed inlet is disposed on an upstream section of the chamber, a downstream end of the chamber is provided with a printing nozzle, the screw is rotatably disposed in the chamber, and the heating apparatus is disposed on an inner wall or an outer wall of the chamber.

Preferably, the binder is a water soluble binder, where the three-dimensional printing material is processed and shaped into a strip-shaped printing material after the metal powder and the water soluble binder are mixed.

Preferably, the printing head includes a guide tube, a throat tube, and a printing nozzle that are sequentially communicated; a peripheral outer wall of the throat tube is provided with a heating apparatus, and the strip-shaped printing material passes through the guide tube and the throat tube.

Preferably, the printing head, the heating apparatus, the printing platform, and the water tank are disposed in an airtight chamber, where an interior of the airtight chamber has a vacuum environment or an inert gas environment. Further, the interior of the sintering shaping chamber has a vacuum environment or an inert gas environment.

Preferably, the water tank contains warm water, a temperature range of the warm water is between 60° C. and 80° C., the water contained in the water tank is deoxidized, and a heating temperature of the heating apparatus is controlled between 50° C. and 200° C.

Another metal three-dimensional printer provided in the present invention includes a printing head, where the printing head contains a three-dimensional printing material, the three-dimensional printing material includes metal powder and a binder, and a weight percentage of the metal powder in the three-dimensional printing material is more than 60%; the metal three-dimensional printer further includes a heating apparatus, configured to heat the three-dimensional printing material in the printing head, and a heating temperature of the heating apparatus is controlled between 50° C. and 300° C., and the binder bonds the metal powder at 50° C. to 300° C.; and the metal three-dimensional printer further includes a printing platform, configured to bear the three-dimensional printing material extruded by the printing head, to form a preliminary cured object.

Preferably, the printer further includes a sintering shaping chamber, configured to perform sintering shaping on the preliminary cured object.

Another metal three-dimensional printer provided in the present invention includes a printing head, configured to contain a three-dimensional printing material; the metal three-dimensional printer further includes a heating apparatus, configured to heat the three-dimensional printing material in the printing head; the metal three-dimensional printer further includes a printing platform, configured to bear the three-dimensional printing material sprayed by the printing head, to form a preliminary cured object; and the printing head includes a guide tube, a throat tube, and a printing nozzle that are sequentially communicated; a peripheral outer wall of the throat tube is provided with a heating apparatus, and the strip-shaped printing material passes through the guide tube and the throat tube.

The three-dimensional printing material used by the metal three-dimensional printer provided in the present invention includes metal powder and a binder, and a mass fraction of the metal powder is more than 60%.

Preferably, a mass fraction of the metal powder is between 60% and 70%, and a mass fraction of the binder is between 30% and 40%.

Preferably, the binder is a water soluble binder or paraffin wax, and the metal powder is at least one of bronze, a cobalt base alloy, a copper base alloy, a gold base alloy, a nickel base alloy, stainless steel, iron, lead, and a zinc alloy.

Preferably, the water soluble binder is at least one of a polyethylene glycol binder, a polymethylmethacrylate binder, and a polyethylene oxide binder.

Optionally, the binder is a water soluble binder, the water soluble binder is a polyethylene oxide binder, and the polyethylene oxide binder consists 76% of polyoxyethylene, 23% of polyethylene wax, and 1% of stearic acid.

Preferably, the three-dimensional printing material is formed by uniformly mixing the metal powder with the binder. Optionally, the three-dimensional printing material forms a strip-shaped printing material by mixing the metal powder with the water soluble binder.

Beneficial Effects

The process of the printing method implemented by the metal three-dimensional printer provided in the present invention is simple and rapid, and only one printing head is used to shape the mixed metal powder and binder on the printing platform according to the three-dimensional printing method. The binder implements a preliminary curing function on the metal powder to avoid the metal powder from collapsing on the printing platform. After the preliminary shaping of the three-dimensional object is completed, the sintering step is performed to remove the binder and make shaping curing having a relatively strong acting force occur between the metal powder, to finally implement shaping of the three-dimensional object.

The inventor finds, in the research on the printing process, that the weight percentage of the metal powder should be controlled to be more than 60%, because when the metal powder is in this range, a suitable binder material can be found to implement a preliminary curing function on the metal powder. However, when the metal powder is less than 60%, the three-dimensional object shaping process may easily fail.

In addition, during actual printing, the types and ratios of the metal powder and binder can be selected or adjusted according to requirements. When the printing material is selected and printed according to the above preferred solution, the three-dimensional object has a better shaping effect. In addition, the types and ratios of the metal powder and the binder may further be selected or adjusted according to the requirements, and when the printing material is selected and printed according to the above preferred solution, the three-dimensional object has a better shaping effect.

The applicant provides another three-dimensional printer in a Chinese invention patent application with the application number CN2015107564705, in which a printing material includes metal powder and a binder. Because in a subsequent sintering shaping step, the volatilization of the binder easily causes the existence of a cavity structure of the shaped three-dimensional object, before the sintering step, water immersion may be performed on the preliminary cured object by using a water tank provided by an FDM three-dimensional printer, to remove a part of binder of the printing material.

In addition, the three-dimensional printing material provided in the present invention overcomes both the problems that the existing FDM three-dimensional printer is slow in shaping and the power consumption of the existing SLM-type three-dimensional printing is relatively large. Through the bonding effect of the binder, the metal powder is cured to some extent, so that the printing material can be laid down on the printing platform by using the printing head to form the preliminary cured object, and then the sintering step is performed to sinter, cure, and shape the metal powder, to complete the entire printing process, thereby improving the working efficiency and energy utilization rate.

It should be noted that the ratio limitation of the foregoing printing material is of great significance. When the number of the binders is excessively small, the printing material cannot form the preliminary cured object, or the stability of the preliminary cured object is very poor, and when the number of the binders is excessively large, it is found that the structural strength of the sintered and shaped three-dimensional object decreases. Therefore, upon repeated experiments, components of the printing material that are in a suitable ratio are obtained. The applicant provides another printing material in a Chinese invention patent application with the application number CN2015107564705. However, this printing material requires the printer to have two printing heads. The working efficiency is relatively low and the printer's production costs are obviously increased. The present invention also overcomes the above problems.

In addition, the binder may also be another existing suitable adhesive material, but it needs to satisfy the bonding effect for the metal powder so that the printing material completes shaping of the preliminary cured object. For example, the polyethylene glycol binder may be polyethylene glycol or a binder formed by mixing polyethylene glycol with polymethylmethacrylate. The polyethylene oxide binder may be polyoxyethylene, or its composition may also include polyethylene wax and stearic acid. In the prior art, although various types of polyethylene glycol binders and component ratios of the polyethylene oxide binders have been provided, they can be used in the present invention provided that they satisfy the inventive concept of the present invention, that is, the objective of preliminary curing shaping on the metal powder is achieved.

For the strip-shaped printing material, the advantage is that it is easy to adjust the moving rate thereof in time in the printing process, and the cross-sectional area and shape of the strip-shaped printing material are easily controlled during processing and shaping, thereby enhancing its versatility. The manufacturing method of the shaped printing material is similar to the traditional manufacturing method of the noodles food.

Upon experiments, it is found that when different types of water-based binders are used, the required immersion time in the subsequent water immersion step will be different. For example, for a binder formed by mixing polyethylene glycol with polymethylmethacrylate, about 80% of the polyethylene glycol can be removed when the binder is immersed in water for about 16 hours, and after the temperature of the water is increased to 60° C. to 80° C., more than 95% of the polyethylene glycol can be removed in 10 hours. In addition, for the polyethylene oxide binder in the foregoing solution, most of the polyoxyethylene can be removed provided that the preliminary cured object is immersed in water for 60 min to 70 min.

Some binders can produce a bonding effect at room temperature, but some binders produce a bonding effect or the bonding effect is strengthened only after the binders are heated. Therefore, the heating step can enhance the versatility and functionality of the binders. In addition, in the sintering step, the binder usually escapes from the shaped object and volatilizes into the surrounding environment, but this results in the appearance of a hole-like or cavity structure inside the shaped object, reducing its structural strength.

For the water soluble binder, at least one part of the water soluble binder in the preliminary cured object can be removed in priority by using the water immersion step. In this way, during the subsequent sintering shaping, the generation of the hole-like or cavity structure will be extremely reduced, thereby improving the structural strength of the shaped object. In addition, warm water can increase the dissolution rate of the water-soluble binder and increase the working efficiency. In addition, the vacuum airtight space can reduce the heat loss of the heating step and facilitate the sintering and shaping of the three-dimensional object, and such a solution can realize the preliminary shaping step and the water immersion step simultaneously to prevent metal oxidation. In the environment with oxygen, metals, water, and oxygen can easily form various types of oxides, further reducing the quality of the printed object.

The temperature of the heating apparatus may also be another suitable temperature, but this is the preferred solution. The excessively high temperature will consume more energy. If the temperature is excessively low, the bonding effect of the binder will be reduced. The selected temperature of the present invention can well satisfy the printing requirements.

Other objects and features of the present invention will become apparent from the following detailed description considered in conjunction with the accompanying drawings. It is to be understood, however, that the drawings are designed solely for purposes of illustration and not as a definition of the limits of the invention, for which reference should be made to the appended claims. It should be further understood that the drawings are not necessarily drawn to scale and that, unless otherwise indicated, they are merely intended to conceptually illustrate the structures and procedures described herein.

BRIEF DESCRIPTION OF THE DRAWINGS

FIG. 1 is a table of data of a first embodiment of a three-dimensional printing material of the present invention.

FIG. 2 is a table of data of a second embodiment of a three-dimensional printing material of the present invention.

Figure 3:
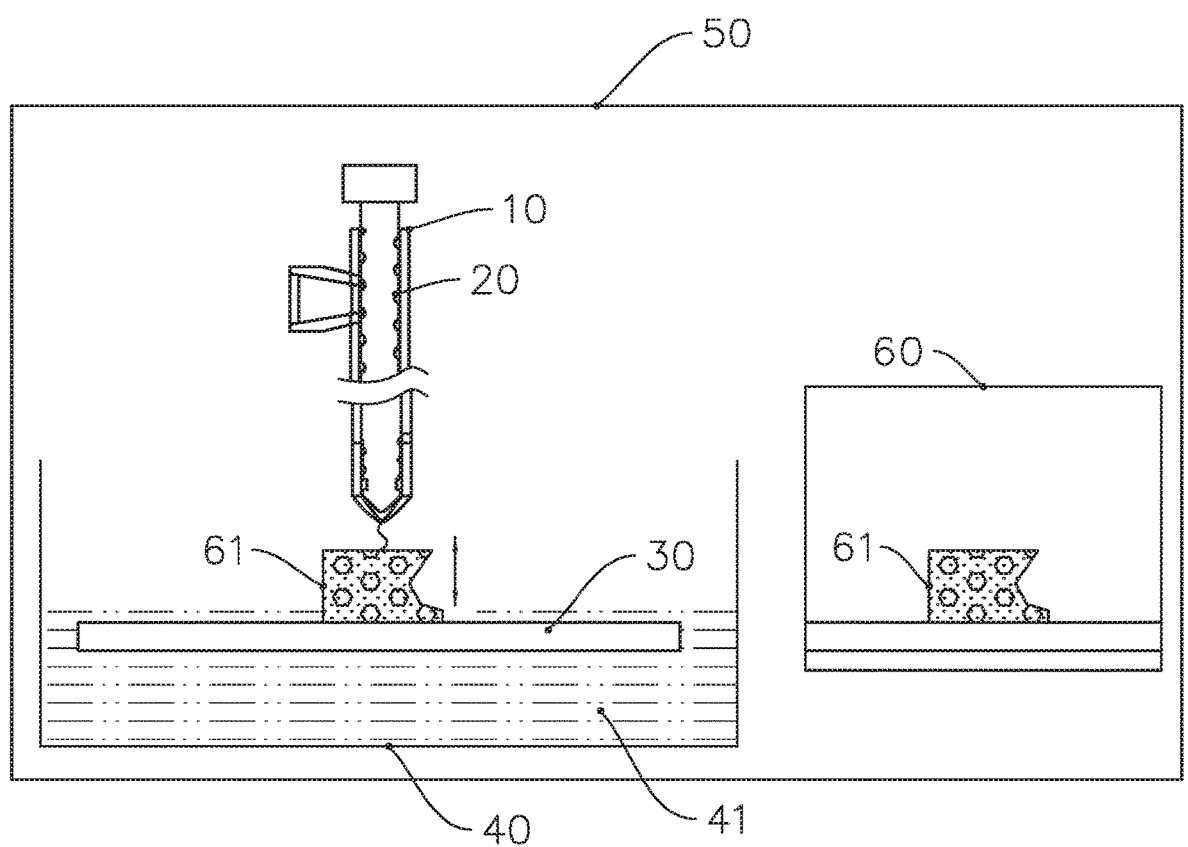
FIG. 3 is a structural diagram of a first embodiment of a three-dimensional printer of the present invention.

The present invention is further described below with reference to the accompanying drawings and embodiments.

DETAILED DESCRIPTION OF THE PRESENTLY PREFERRED EMBODIMENTS

First Group of Embodiments of the Three-Dimensional Printing Material:

The printing material of this embodiment is used in a three-dimensional printer. The printing material consists of metal powder and a binder. A range of the mass fraction of the metal powder is 60% to 70%; a range of a mass fraction of the binder is 30% to 40%, and the printing material is formed by uniformly mixing the metal powder with the binder, or the printing material forms a strip-shaped printing material by mixing the metal powder with a water soluble binder. Specifically, the table of FIG. 1 provides an embodiment of five compounding ratio manners of the printing material.

Optionally, the binder is a water soluble binder or paraffin wax, and the metal powder is bronze, a cobalt base alloy, a copper base alloy, a gold base alloy, a nickel base alloy, stainless steel, iron, lead, or a zinc alloy. The water soluble binder is a polyethylene glycol binder, a polymethylmethacrylate binder, or a polyethylene oxide binder. For example, the polyethylene oxide binder consists of 76% of polyoxyethylene, 23% of polyethylene wax, and 1% of stearic acid. The polyethylene glycol binder may be a binder formed by mixing polyethylene glycol with polymethylmethacrylate.

Second Group of Embodiments of the Three-Dimensional Printing Material:

The three-dimensional printing material of this embodiment may be used in a three-dimensional printer, such as various embodiments of the three-dimensional printer mentioned in the present description. The three-dimensional printing material consists of metal powder and a binder. A weight percentage of the metal powder in the three-dimensional printing material is more than 70%. Preferably, the binder is resin wax, light curable wax, or a light curable UV material, and the metal powder is at least one of bronze, a cobalt base alloy, a copper base alloy, a gold base alloy, a nickel base alloy, stainless steel, iron, lead, and a zinc alloy. The binder and the metal powder can be selectively paired and used according to requirements, and the light curable material or the light curable wax can bond the metal powder after being heated to 50° C. to 300° C.

Preferably, the printing material is formed by uniformly mixing the metal powder with the binder, or the printing material forms a strip-shaped printing material by mixing the metal powder with the binder. Specifically, the table of FIG. 2 provides five different compounding ratios of the printing material in this embodiment. Compared with the foregoing first embodiment, the metal powder in this embodiment has a relatively large specific gravity, the metal powder has a specific gravity of more than 70%, and the shaped three-dimensional object has a relatively large density, and the hardness and strength of the sintered and shaped three-dimensional object are also accordingly improved.

In other groups of embodiments, the types that are of the metal powder and the binder and that are specifically selected in the first embodiment and the second embodiment can be used in overlapping and paired manners. Other additional components, such as pigments and magnetic materials can also be added into the three-dimensional printing material. In other groups of embodiments, the metal powder may specifically be iron base powder, heavy metal powder, light metal powder, rare metal powder or precious metal powder. The iron base powder can be iron, carbon steel, alloy steel, stainless steel, high-speed steel, or the like. The heavy metal powder may be copper, bronze, brass, nickel or a nickel base alloy. The light metal powder may be aluminum, an aluminum alloy, titanium or a titanium alloy. The rare metal may be tungsten, a tungsten base alloy, molybdenum or a molybdenum base alloy. The precious metal powder may be platinum.

First Embodiment of a Metal Three-Dimensional Printer:

As shown in FIG. 3, the metal three-dimensional printer of this embodiment is an FDM three-dimensional printer, including a printing head 10, a heating apparatus 20, a printing platform 30, a water tank 40, an airtight chamber 50, and a sintering shaping chamber 60. The printing head 10, the heating apparatus 20, the printing platform 30, and the water tank 40 are all disposed in the airtight chamber 50. The interiors of the airtight chamber 50 and the sintering shaping chamber 60 both have vacuum environments or inert gas environments. Certainly, the sintering shaping chamber 60 may also be disposed outside a body of the three-dimensional printer. That is, the three-dimensional printer may not include the sintering shaping chamber 60.

The water tank 40 contains water 41. The printing platform 30 may move to below a liquid level in the water tank 40. The water tank 40 preferably contains warm water. A temperature range of the warm water is between 60° C. and 80° C. The warm water is deoxidized to prevent metal oxidization. The movement manner of the printing platform 30 in the water tank 40 can be controlled by means of screw transmission and can be controlled by means of the control effect of the controller of the three-dimensional printer.

The sintering shaping chamber 60 is configured to perform sintering and shaping on the preliminary cured object 61. The temperature in the sintering step is preferably controlled between 200° C. and 2000° C. The high-temperature sintering process is relatively common in the powder metal shaping process, and its main purpose is to enhance the structural strength of the three-dimensional object. Those skilled in the art can select suitable temperatures for different types of metal powder materials to perform sintering and shaping on the preliminary cured object 61.

Figure 4:
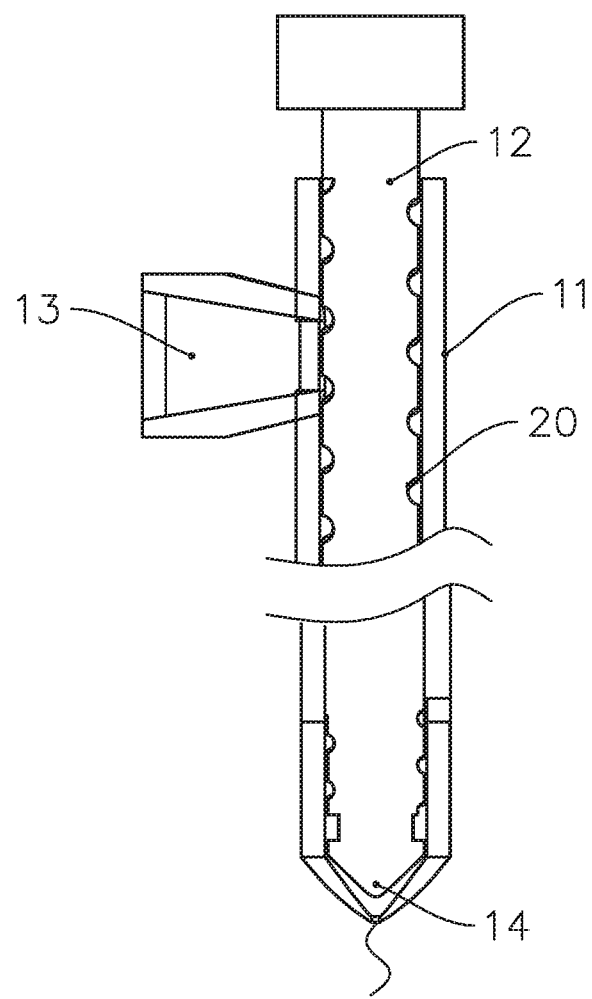
FIG. 4 is a structural diagram of components such as a printing head of a first embodiment of a three-dimensional printer of the present invention.

As shown in FIG. 4, the printing head 10 has a chamber 11, a screw 12, and a feed inlet 13, where the feed inlet 13 is disposed on an upstream section of the chamber 11, a downstream end of the chamber 11 is provided with a printing nozzle 14, the screw 12 is rotatably disposed in the chamber 11, and the heating apparatus 20 is disposed on an inner wall of the chamber 11. In other embodiments, the heating apparatus 20 may also be disposed on an outer wall of the chamber 11. The chamber 11 of the printing head 10 is used for containing the printing material, and the printing material is supplemented into the chamber 11 from the feed inlet 13. The printing material consists of metal power with a mass fraction of 60% to 70% and a binder with a mass fraction of 30% to 40%, and the printing material is formed by uniformly mixing the metal powder with the binder.

The heating apparatus 20 is configured to heat the printing material in the chamber 11. The heating apparatus 20 is specifically an electric heating coil. In other embodiments, other types of heating apparatuses may also be used. The heating temperature of the heating apparatus 20 is controlled between 50° C. and 200° C. The printing platform 30 is configured to bear the printing material extruded by the printing head 10 to form a preliminary cured object, and the printing head 10 can perform movement in a three-dimensional direction with respect to the printing platform 30.

A plurality of types of mutual movement forms of a printing platform and a printing head appear in the prior art. For example, the Chinese invention patent application documents with the application numbers CN201510054483.8 and CN201410609259.6 both disclose a printing head that performs two-dimensional (X and Y directions) movement in a horizontal direction and a printing platform that moves in a vertical direction (Z direction). In other embodiments, the printing platform may also be kept at a fixed location, and the printing head moves in any three-dimensional direction within a certain spatial range. For example, a Chinese invention patent application with the application number CN201310246765.9, or a Chinese utility model patent application with the application number CN201420137806.0 discloses a solution in which the printing platform is always located at a fixed location, and the printing head can move in a three-dimensional direction with respect to the printing platform.

The FDM three-dimensional printer of this embodiment can achieve three-dimensional printing through the following steps.

First, a preliminary shaping step is performed: the printing material is continuously loaded into the chamber 11 from the feed inlet 13, and the printing material is driven by means of the rotation effect of the screw 12 to be continuously extruded from the printing nozzle 14, so that the printing material is extruded onto the printing platform 30 to form a preliminary cured object. At the same time, the printing material in the chamber 11 can be heated by using the heating apparatus 20, and the heating temperature is controlled between 50° C. and 200° C.

Figure 5:
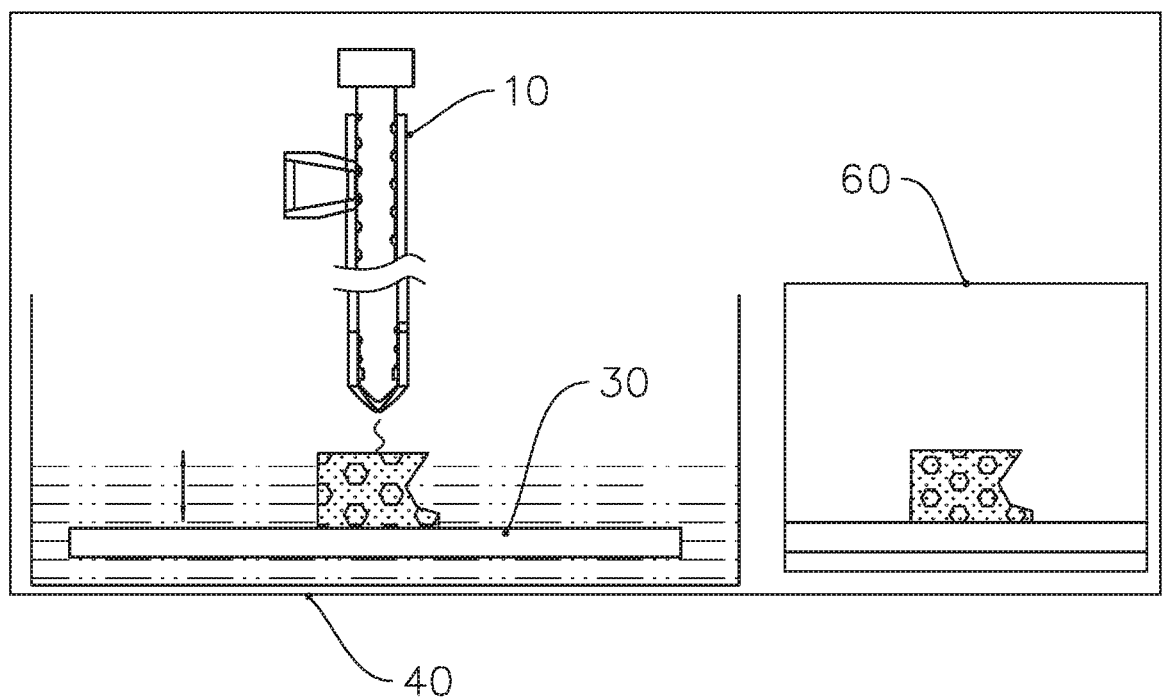
FIG. 5 is a printing status diagram of a first embodiment of a three-dimensional printer of the present invention.

Then, the water immersion step is performed. In the water immersion step, the preliminary cured object is placed in water of the water tank 40. The water soluble binder in the preliminary cured object is partially or completely dissolved in the water. Specifically, the water immersion step can take two forms. The first form is shown in FIG. 3. After the preliminary shaping step is performed, the water immersion step is performed. That is, after a complete preliminary cured object is formed on the printing platform 30, the printing platform 30 is lowered to below the liquid level of water, and the preliminary cured object can be taken out after being immersed in the water for a period of time. In other implementations, the preliminary cured object on the printing platform 30 may also be manually moved into the water tank 40. The second form is shown in FIG. 5. The preliminary shaping step and the water immersion step are performed simultaneously. That is, when the printing head 10 is extruding the printing material on the printing platform 30, the printing platform 30 is already below the liquid level of the water, so that the preliminary cured object is printed while the water soluble binder is dissolved into the water of the water tank 40.

Finally, a sintering step is performed to move the preliminary cured object passing the water immersion step into the sintering shaping chamber 60. The movement manner may be manual movement or automatically moving, by means of automated control, the printing platform into the sintering shaping chamber 60. After the preliminary cured object is sintered and cured in the sintering shaping chamber 60, a shaped object is formed, and the temperature in the sintering step is usually controlled between 200° C. and 2000° C.

Figure 6:
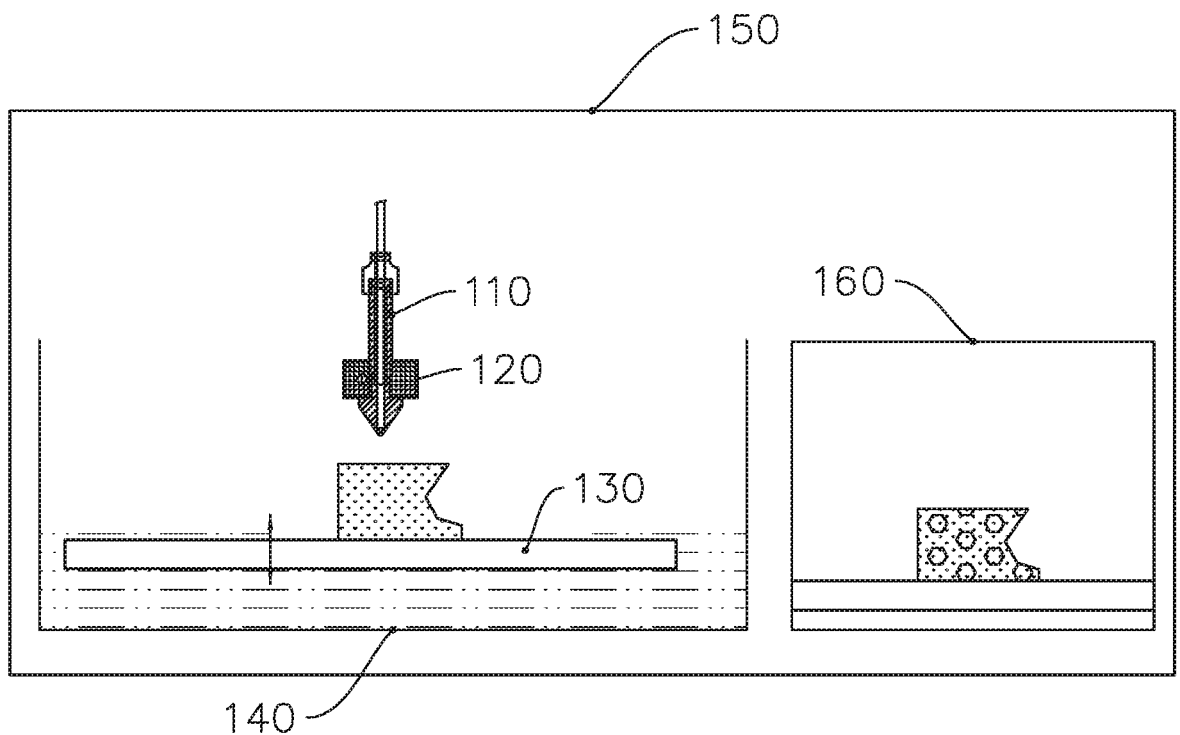
FIG. 6 is a structural diagram of a second embodiment of a three-dimensional printer of the present invention.

Second Embodiment of a Metal Three-Dimensional Printer:

As shown in FIG. 6, the metal three-dimensional printer of this embodiment is an FDM three-dimensional printer, including a printing head 110, a heating apparatus 120, a printing platform 130, a water tank 140, an airtight chamber 150, and a sintering shaping chamber 160. The printing head 110, the heating apparatus 120, the printing platform 130, and the water tank 140 are disposed in the airtight chamber 150. The interiors of the airtight chamber 150 and the sintering shaping chamber 160 have vacuum environments or inert gas environments. Certainly, the sintering shaping chamber 160 may also be disposed outside a body of the three-dimensional printer. That is, the sintering shaping chamber 160 may be disposed outside the airtight chamber 150.

Figure 7:
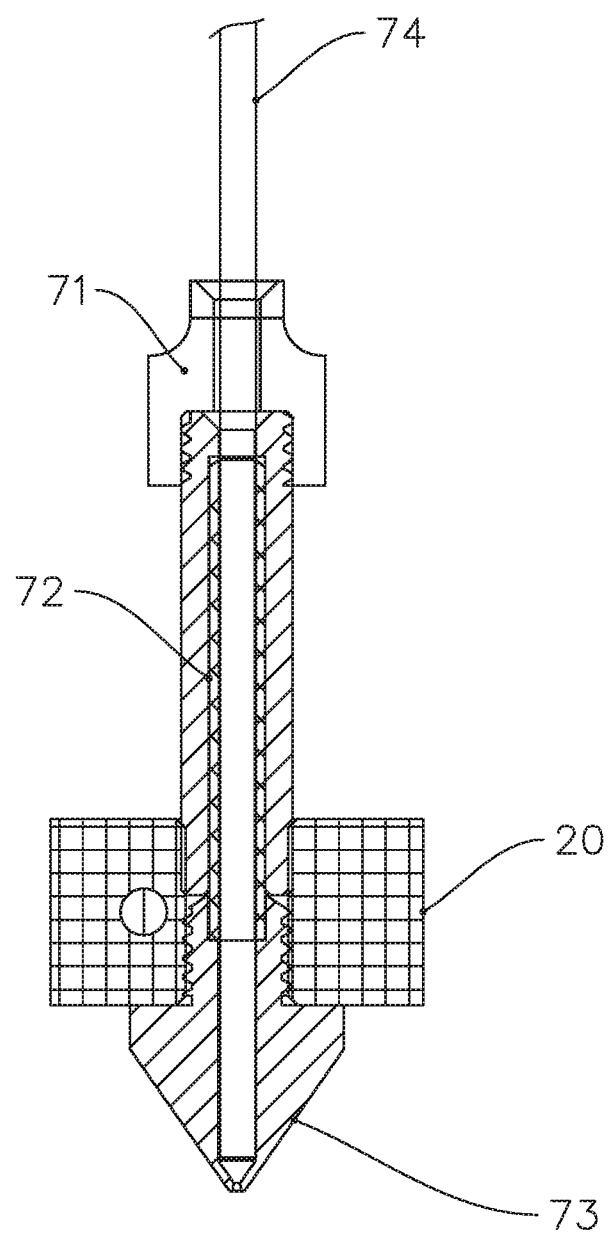
FIG. 7 is a structural diagram of components such as a printing head of a second embodiment of a three-dimensional printer of the present invention.

The binder of this embodiment is a water soluble binder. The printing material is processed into a strip-shaped printing material by the metal powder with the water soluble binder. The manufacturing method of the printing material is similar to the traditional manufacturing method of the noodles food. As shown in FIG. 7, the printing head of this embodiment includes a guide tube 71, a throat tube 72, and a printing nozzle 73 that are sequentially communicated. A peripheral outer wall of the throat tube 72 is provided with a heating apparatus 120, which is a heating coil. The strip-shaped printing material 72 passes through the guide tube 71 and the throat 72, and is finally extruded onto the printing platform 130 by using the printing nozzle 73.

In addition, in other embodiments, the printing material may also be extruded onto the printing platform by using a retractable container in a manner of spraying outwards. In addition, the powder material in the printing head may also be extruded onto the printing platform in a manner of controlling a flow by using an electric valve.

It should be noted that the three-dimensional printer mentioned in this embodiment of the present invention differs from the existing three-dimensional printer. The printing material in the printing head of the existing metal three-dimensional printer is usually a resin material such as PLA, and the PLA is extruded by the printing head after being heated and melted. After the heating apparatus of the printing head of the three-dimensional printer of this embodiment of the present invention heats the binder, the binder melts to a certain extent, thereby producing a bonding effect on the metal powder. At the moment, the mixed state formed by the binder and the metal powder is relatively similar to the PLA melted in the existing printing head. Therefore, in this embodiment of the present invention, the three-dimensional printer is referred to as an FDM three-dimensional printer, but this limiting function is mainly intended to facilitate the understanding and classification of technicians, and obviously can also be directly named as a three-dimensional printer. The binder mentioned in the present invention may also be understood as an adhesive.

Finally, it should be noted that the present invention is not limited to the foregoing implementations. For example, the designs such as setting the water in the water tank to other temperatures, and extracting air in the sintering shaping chamber and the airtight chamber in a cycling manner by using a vacuum pump also fall within the scope of the claims of the present invention.

INDUSTRIAL APPLICABILITY

The metal three-dimensional printer provided by the present invention can be used for printing metal materials. For example, metal powder is printed into a preset shape by using the three-dimensional printer. To realize bonding for the metal powder, a binder is added to the three-dimensional printing material, and the binder implements a preliminary curing function on the metal powder so as to prevent the metal powder from collapsing on the printing platform.

Because the three-dimensional printing method includes a preliminary shaping step and a sintering step, after the preliminary shaping of the three-dimensional object is completed, the sintering step is performed to remove the binder and make shaping curing having a relatively strong acting force occur between the metal powder, to finally implement shaping of the three-dimensional object.

By using the shaping method of the present invention, a metal object shaped by means of three-dimensional printing can be obtained. For example, the method can be used for printing a metal part as a sample, or can be used for printing a metal model, and has a wide range of applications in the fields of metal sample manufacturing, precision mold processing, and the like.

Thus, while there have shown and described and pointed out fundamental novel features of the invention as applied to a preferred embodiment thereof, it will be understood that various omissions and substitutions and changes in the form and details of the devices illustrated, and in their operation, may be made by those skilled in the art without departing from the spirit of the invention. For example, it is expressly intended that all combinations of those elements and/or method steps which perform substantially the same function in substantially the same way to achieve the same results are within the scope of the invention. Moreover, it should be recognized that structures and/or elements and/or method steps shown and/or described in connection with any disclosed form or embodiment of the invention may be incorporated in any other disclosed or described or suggested form or embodiment as a general matter of design choice. It is the intention, therefore, to be limited only as indicated by the scope of the claims appended hereto.

What is claimed is:

1. A metal three-dimensional printer, comprising:
a printing head, wherein the printing head contains a three-dimensional printing material, the three-dimensional printing material comprises metal powder and a binder, and a weight percentage of the metal powder in the three-dimensional printing material is more than 60%; the printing head comprises a guide tube, a throat tube, and a printing nozzle that are sequentially communicated, and a strip-shaped printing material passes through the guide tube and the throat tube;
a heating apparatus, configured to heat the three-dimensional printing material in the printing head, and a heating temperature of the heating apparatus is controlled between 50° C. and 300° C., and the binder bonds the metal powder at 50° C. to 300° C.;
a printing platform, configured to bear the three-dimensional printing material extruded by the printing head, to form a preliminary cured object, wherein the printing head can perform movement in a three-directional direction with respect to the printing platform; and
a sintering shaping chamber, configured to perform sintering shaping on the preliminary cured object,
wherein the printing head has a printing head chamber, a screw, and a feed inlet, and wherein the feed inlet is disposed on an upstream section of the printing head chamber, the printing nozzle is provided on a downstream end of the printing head chamber, the screw is rotatably disposed in the printing head chamber, and the heating apparatus is disposed on an inner wall or an outer wall of the printing head chamber.

2. The metal three-dimensional printer according to claim 1, wherein:
the binder is a water soluble binder, wherein the three-dimensional printing material is processed and shaped into the strip-shaped printing material after the metal powder and the water soluble binder are mixed.

3. The metal three-dimensional printer according to claim 1, wherein:
the printing head, the heating apparatus, and the printing platform are disposed in an airtight chamber, wherein an interior of the airtight chamber has a vacuum environment or an inert gas environment.

4. The metal three-dimensional printer according to claim 1, wherein:
the interior of the sintering shaping chamber has a vacuum environment or an inert gas environment.

5. The metal three-dimensional printer according to claim 1, wherein:
the heating temperature of the heating apparatus is controlled between 50° C. and 200° C.

6. The metal three-dimensional printer according to claim 1, wherein:
a temperature in the sintering step is controlled between 200° C. and 2000° C.

7. The metal three-dimensional printer according to claim 1, wherein:
the three-dimensional printer further comprises a water tank, the water tank contains water, and the water in the water tank is used to immerse the preliminary cured object.

* * * * *